(12) United States Patent
Liu

(10) Patent No.: US 11,752,714 B2
(45) Date of Patent: Sep. 12, 2023

(54) LIGHT GUIDE FILM PRODUCTION DEVICE

(71) Applicant: NANJING BREADY ELECTRONICS CO., LTD., Nanjing (CN)

(72) Inventor: Yong Liu, Nanjing (CN)

(73) Assignee: NANJING BREADY ELECTRONICS CO., LTD., Nanjing (CN)

( * ) Notice: Subject to any disclaimer, the term of this patent is extended or adjusted under 35 U.S.C. 154(b) by 523 days.

(21) Appl. No.: 16/965,744

(22) PCT Filed: Jun. 10, 2020

(86) PCT No.: PCT/CN2020/095412
§ 371 (c)(1),
(2) Date: Jul. 29, 2020

(87) PCT Pub. No.: WO2020/177781
PCT Pub. Date: Sep. 10, 2020

(65) Prior Publication Data
US 2021/0229380 A1 Jul. 29, 2021

(30) Foreign Application Priority Data
Dec. 3, 2019 (CN) .......................... 201911216970.4

(51) Int. Cl.
*B29D 11/00* (2006.01)
*B29C 48/90* (2019.01)
(Continued)

(52) U.S. Cl.
CPC .... *B29D 11/00663* (2013.01); *B29C 48/0019* (2019.02); *B29C 48/90* (2019.02);
(Continued)

(58) Field of Classification Search
CPC . B29C 48/0019; B29C 48/0022; B29C 48/08; B29C 48/36; B29C 48/90; B29C 48/919; B29C 48/9135; B29D 11/00663
See application file for complete search history.

(56) References Cited

U.S. PATENT DOCUMENTS 6,818,683 B2 * 11/2004 Bodaghi ................. B29C 48/37
523/210
8,919,232 B2 * 12/2014 Kozasa .................. B65H 20/32
83/79

FOREIGN PATENT DOCUMENTS

| CN | 206999687 U | * | 2/2018 | |
| CN | 110065187 A | * | 7/2019 | |
| WO | WO-0210487 A2 | * | 2/2002 | ............... D01F 6/32 |

* cited by examiner

*Primary Examiner* — Seyed Masoud Malekzadeh
(74) *Attorney, Agent, or Firm* — HAUPTMAN HAM, LLP

(57) ABSTRACT

The present invention relates to the technical field of optical film production, and provides a light guide film production device, including a feeding unit, a fusion stirring unit, an extrusion molding unit, a cooling shaping unit, a guide leveling unit, a flattening unit, and a finished product winding unit. The cooling shaping unit is provided with a first water tank to perform heat exchange on an extruded light guide film for heat recovery, so that edge film pressing mechanisms press pressure blocks at the edge film positions using the memory effect of a memory alloy. Circulating water of the first water tank subjected to heat exchange is delivered to a second water tank disposed in the flattening unit, so that a first conveyor belt made of the memory alloy in a third drive device drives a second rolling roller set to rotate to realize secondary utilization of recovered heat. In the present invention, an air delivery mechanism with one airflow pipe to the cooling shaping unit, and the other airflow pipe to the flattening unit is further provided.

(Continued)

According to the present invention, the heat of the light guide film production process is used to improve the quality of the light guide film and reduce the energy consumption of the light guide film production process.

10 Claims, 5 Drawing Sheets

(51) Int. Cl.
*B65H 20/04* (2006.01)
*B29C 48/36* (2019.01)
*B29C 48/88* (2019.01)
*B29C 48/08* (2019.01)
*B29C 48/00* (2019.01)

(52) U.S. Cl.
CPC .......... *B65H 20/04* (2013.01); *B29C 48/0022* (2019.02); *B29C 48/08* (2019.02); *B29C 48/36* (2019.02); *B29C 48/919* (2019.02); *B29C 48/9135* (2019.02); *B65H 2301/5144* (2013.01)

LIGHT GUIDE FILM PRODUCTION DEVICE

RELATED APPLICATIONS

The present application is a U.S. National Phase of International Application Number PCT/CN2020/095412, filed Jun. 10, 2020, and claims the priority of Chinese Application No. 201911216970.4, filed Dec. 3, 2019.

TECHNICAL FIELD

The present invention relates to the technical field of optical film production, and in particular, to a light guide film production device.

BACKGROUND

After being extruded and stretched, raw materials of the light guide film sequentially move into a film cooling region, a flattening region, and a winding and cutting region, so as to achieve the cooling shaping and the flattening winding of the light guide film, thereby completing the process of forming the light guide film. The prior art mainly adopts water cooling or air cooling, and the light guide film is directly sprayed through water cooling, which causes a large amount of water to be left on the surface of the light guide film. A drying unit needs to be added in the production section to evaporate water on the surface of the light guide film. In addition, air cooling is used directly. Generally, the light guide film directly passes through the cold wind region, and the cooling of the surface of the light guide film is uneven, the middle part of the film is cooled faster due to concentrated wind, and the edge film is cooled slower due to scattered wind, which causes the thickness of the light guide film uneven.

In addition, based on the current social development, the thickness of the light guide film is required to be thinner and thinner. When the light guide film with a thin thickness is completely cooled and shaped and conveyed to the winding machine, due to a certain gap between the mechanism in the flattening region and the winding machine, some longitudinal creases may occur in the light guide film with a thin thickness between two devices or two rollers of the same device under the action of traction tension and tensile stress, the longer the production line is, the greater the space distance is, the more serious the creases are. If the creases are not removed in time, the thickness measurement value of the creased light guide film is inaccurate, and the phenomenon of ribs may occur during winding. Therefore, the prior art adopts a flattening unit to eliminate longitudinal creases, but the existing flattening device is fixed, the light guide film passes between the two flat surfaces of the flattening device, and the light guide film always moves relative to the flattening device. Although the film can be flattened in the area of the flat surface, creases may be formed on the edges of the flat surface due to the movement of the light guide film, that is, the film may be damaged due to the asynchronous movement of the light guide film and the flattening device.

SUMMARY

An objective of the present invention is to provide a light guide film production device, which efficiently utilizes the heat circulation of the light guide film production process, and uniform cooling of the light guide film is ensured by a cooling shaping unit, which effectively avoids uneven thickness and creases of the light guide film, and improves the quality of the light guide film.

To achieve the foregoing objective, the present invention provides the following technical solution: a light guide film production device, including a mounting bracket, and a feeding unit, a fusion stirring unit, an extrusion molding unit, a cooling shaping unit, a guide leveling unit, a flattening unit, and a finished product winding unit which are sequentially arranged on the mounting bracket, where the feeding unit includes a feeding port which is formed at the top of the light guide film production device; the fusion stirring unit includes a stirring tank, and a stirring drive device and a stirring blade spindle connected to an output end of the stirring drive device, as well as stirring blades connected to the stirring blade spindle, the stirring drive device and the stirring blade spindle being respectively disposed in the stirring tank; the feeding port is communicated with the stirring tank by means of a delivery pipe; the extrusion molding unit includes a stamping head disposed at the bottom of the stirring tank, a first rolling roller set disposed directly under the stamping head, and a first drive device configured to drive the first rolling roller set to rotate; the stamping head is communicated with the stirring tank and configured to supply raw materials stirred by the fusion stirring unit to the first rolling roller set at a slow speed; the first rolling roller set is configured to extrude the raw materials into a light guide film; the cooling shaping unit is disposed under the extrusion molding unit, includes a first water tank and a plurality of edge film pressing mechanisms, and is configured to relatively fix the edge film of the extruded light guide film to achieve the cooling and shaping of the light guide film; the guide leveling unit is disposed below the cooling shaping unit, and is configured to adjust the light guide film transmitted in the vertical direction to be transmitted in the horizontal direction; the flattening unit is configured to prevent warping and creasing of the light guide film; the finished product winding unit includes a cutter mechanism and a winding machine; and the cutter mechanism is configured to cut the light guide film when the light guide film wound by the winding machine reaches a set length. The present invention realizes the heat-exchange cooling of the circulating water with the light guide film, and further fully utilizes the circulating water after heat exchange, reduces the energy consumption of the light guide film production process, lowers the production cost and improves the production quality of the light guide film.

Specifically, the first water tank is set as a square tube structure which is provided with a first water inlet at one end in the length direction and a first water outlet at the other end; the light guide film perpendicularly penetrates through the inside of the square tube structure from the end where the first water inlet is formed, and the central axis of the light guide film coincides with the central axis of the square tube structure; and a wall surface parallel to the surface of the light guide film in inner wall surfaces of the square tube structure is defined as a first wall surface, and a wall surface perpendicular to the surface of the light guide film in the inner wall surfaces of the square tube structure is defined as a second wall surface.

The edge film pressing mechanisms are disposed on the first wall surface in a direction parallel to the central axis of the square tube structure; at least two edge film pressing mechanisms are correspondingly disposed on each of the first wall surfaces; and the edge film pressing mechanisms on two first wall surfaces parallel to each other are symmetrical on both sides of the light guide film in the width direction; the edge film pressing mechanism includes a boss, a linear guide rail provided with a plurality of sliders, a plurality of pressure blocks, and a plurality of memory alloy plates with an arc memory shape; the boss is disposed along the direction of the central axis of the square tube structure, and the cross section of the boss along the length direction is a U-like structure, and an opening of the U-like structure faces the first wall surface; the linear guide rail is arranged along the length direction of the boss, and further includes a first sliding groove, a screw rod disposed in the first sliding groove, and a second drive device connected to the screw rod; the screw rod is parallel to the first sliding groove; the sliders are sleeved on the screw rod and move in the first sliding groove along the length direction of the screw rod; end faces of the sliders close to the light guide film are provided with elastic elements; the elastic elements are connected to the pressure blocks; a plurality of memory alloy plate installation stations are formed on the part of the first wall surface forming a surrounding structure with the boss, and the memory alloy plates are disposed in the memory alloy plate installation stations; openings having one-to-one correspondence to the memory alloy plate installation stations are formed at the bottom of the U-like structure of the boss, and the size of the openings is at most such that when the memory alloy plates are heated to recover the arc shape, a part of the arc passes through the opening and abuts against the pressure blocks, so that the pressure blocks press the edge film of the light guide film.

The cooling shaping unit presses the edge film when the memory alloy plates are heated to recover the memory shape, and then provides the tensile extension of the light guide film in its width direction via the elastic control of the elastic element, effectively preventing the light guide film from being deformed when it is cooled to produce creases and unevenness.

The flattening unit includes a second rolling roller set, and a third drive device configured to drive the second rolling roller set to rotate; the second rolling roller set includes two parallel and corresponding cylindrical rolling rollers disposed at both sides of the light guide film in the thickness direction; the roller surfaces of the two cylindrical rolling rollers abut against the surface of the light guide film; a hollow hub-like structure is disposed inside the cylindrical rolling roller, and includes a roller shaft and a plurality of blades; the third drive device includes a second water tank, a driving wheel, a first driven wheel, a first conveyor belt made of memory alloy, a second driven wheel, a third driven wheel, a second conveyor belt, and a motor; the second water tank is communicated with the first water outlet by means of a pipe, and the driving wheel is disposed in the second water tank; the first driven wheel and the second driven wheel are spaced apart at one end of the roller shaft of any of the cylindrical rolling rollers; the third driven wheel is disposed on the end of the roller shaft of the other cylindrical rolling roller at the same side, and the position of the first driven wheel corresponds to that of the driving wheel; the first conveyor belt is sleeved on the driving wheel and the first driven wheel, the second conveyor belt is sleeved on the second driven wheel and the third driven wheel, and at least part of the first conveyor belt is submerged in the circulating water in the second water tank; and the motor is disposed at the end of the first driven wheel where the roller shaft is mounted, and is configured to initially start the rotation of the first driven wheel to rotate.

The first conveyor belt made of memory alloy can be continuously deformed in the circulating water of the second water tank after the rotation under the initial drive of the motor stops, maintaining the rotation of the second conveyor belt and realizing the continuous rotation of the driving wheel, so that the second rolling roller set has a certain rotation speed, to avoid the light guide film damage caused by the asynchronous movement of the second rolling roller set driven by the light guide film transmission, and to realize the secondary use of the cooling heat-exchange energy of the light guide film. Moreover, the light guide film conveyed between the flattening unit and the finished product winding unit can be further flattened to remove creases and eliminate the phenomenon of winding ribs.

Further, the cooling shaping unit further includes an air delivery mechanism which includes a compressed air source, a plurality of first airflow pipes, and air nozzles; the air nozzles are arranged on the second wall surfaces in a direction parallel to the central axis of the square tube structure, and two air nozzles are disposed on any of the second wall surfaces, and the two air nozzles are symmetrical along the thickness direction of the light guide film; the air nozzle includes a first mounting plate, a second mounting plate, and two bottom plates; the first mounting plate, the second mounting plate, the two bottom plates and the second wall surface together form a cavity structure with one side open and two ends closed; an opening is formed on the side of the cavity structure away from the second wall surface; the opening is parallel to the central axis of the square tube structure and faces the matching position of the edge film pressing mechanism and the light guide film; one end of the first airflow pipe is communicated with an outlet of the compressed air source, and the other end penetrates from the outside of the square tube structure through the bottom plates to communicate with the cavity structure; and the two bottom plates of the air nozzle are each connected to one first airflow pipe. The air delivery mechanism is conducive to the uniform heat exchange of the light guide film and speeds up the cooling and shaping of the light guide film.

Further, the air delivery mechanism further includes a plurality of second airflow pipes; one end of the second airflow pipe is communicated with the outlet of the compressed air source, and the other end extends between two adjacent blades of the cylindrical rolling roller, and the part of the second airflow pipe extending inside the cylindrical rolling roller is parallel to the roller shaft of the cylindrical rolling roller; the end of the part of the second airflow pipe extending inside the cylindrical rolling roller is closed, and a plurality of blow holes are uniformly formed on the side wall of the pipe close to the blades on one side; the blow holes are used for blowing the blades to rotate; any of the cylindrical rolling rollers in the second rolling roller set is provided with at least one second airflow pipe partially extending inside the cylindrical rolling roller, and any of the second airflow pipes disposed in the same cylindrical rolling roller blows the blades to drive the cylindrical rolling roller to rotate in the same direction. The air delivery mechanism can be applied to start the flattening unit initially, and can also be used as a power supplement when the flattening unit works, so as to improve the working quality of the flattening unit.

Further, the slider is also connected to a support mechanism for supporting the pressure block; the support mechanism is disposed below the elastic element, and includes a first connecting rod, a second connecting rod, and a second sliding groove; one end of the first connecting rod is connected to the slider, and the other end is connected to the second sliding groove; one end of the second connecting rod is connected to the pressure block, and the other end is movably disposed in the second sliding groove; and the pressure block moves toward the surface of the light guide film under the abut-against action when the memory alloy plates are heated to recover the arc shape, and drives the second connecting rod to slide in the second sliding groove.

Further, two cover blocks facing and spaced apart from each other along the length direction of the boss are provided in the memory alloy plate installation station; slots extending toward the inside of the cover blocks are formed on opposite side surfaces of the two cover blocks; the slots are used for fixing the ends of the memory alloy plates, and the depth of the slots is at least such that the memory alloy plates do not fall out of the slots when the memory alloy plates are heated to recover the arc shape.

Further, the guide leveling unit includes a leveling right-angle mechanism and a guide wheel; the leveling right-angle mechanism includes a first plane located in the vertical direction, a second plane located in the horizontal direction, and an arc-shaped transitional connection portion for connecting the first plane and the second plane to form a right angle; the guide wheel is disposed on the side of the arc-shaped transitional connection portion close to the center of a circle; the guide wheel is parallel to any of the cylindrical rolling rollers in the second rolling roller set, and has a degree of freedom to rotate about a guide wheel axle; the guide wheel is in clearance fit to the arc-shaped transitional connection portion; and a first water channel is formed on the guide wheel axle along its axial direction, a second water channel is formed in the arc-shaped transitional connection portion, and the first water channel and the second water channel are respectively communicated with the first water tank by means of pipes. On the one hand, the first water channel and the second water channel are used for secondary heat exchange with the light guide film, and on the other hand, it is beneficial to eliminate thermal stress inside the light guide film.

Further, the ridge of an end face of the pressure block close to the light guide film is set as an arc-shaped transition structure to prevent the pressure block from generating indentations on the surface of the light guide film.

Further, a polygonal rolling roller set correspondingly disposed at both sides of the light guide film in the thickness direction is also provided between the flattening unit and the finished product winding unit, and the axial direction of the polygonal rolling roller set is parallel to the axial direction of the second rolling roller set.

Further, the cutter mechanism includes a mounting shaft disposed perpendicular to the surface of the light guide film in the vertical direction, a cylinder, a plurality of fan-shaped planes arranged along the axial circumference of the mounting shaft, and a cutter mounted on the side of any of the fan-shaped planes close to the light guide film; the cutter is parallel to an edge on the arc side of the fan-shaped plane; the mounting shaft is movably connected to the mounting bracket, and has a degree of freedom to rotate on the mounting bracket along the radial direction; ribs are disposed at the middle of the arc side of any of the fan-shaped planes close to the mounting shaft; grooves extending to the end face of the mounting shaft close to the light guide film are formed on the mounting shaft at the positions corresponding to the ribs; the ribs are adapted to the grooves; the cylinder is disposed on the mounting bracket; a locking mechanism is disposed at the end of a cylinder telescopic rod away from the cylinder, and is configured to lock and fix the cutter of any of the fan-shaped planes, and when any of the fan-shaped planes is fixed to the cylinder, the cutter on the fan-shaped plane is perpendicular to the length direction of the light guide film. The cutter mechanism facilitates replacing the cutters of the light guide film production device and is applied to light guide film production lines of different sizes.

It can be known from the foregoing technical solution that the light guide film production device provided by the technical solution of the present invention obtains the following beneficial effects:

the light guide film production device disclosed by the present invention has a clear structure and includes a mounting bracket, and a feeding unit, a fusion stirring unit, an extrusion molding unit, a cooling shaping unit, a guide leveling unit, a flattening unit, and a finished product winding unit which are sequentially arranged on the mounting bracket; the present invention provides a first water tank and edge film pressing mechanisms in the cooling shaping unit to perform heat exchange on an extruded light guide film for heat recovery, and pressure blocks in the edge film pressing mechanisms are pressed at the edge film positions using the memory effect of a memory alloy and temperature, which effectively ensures that the light guide film does not produce creases and uneven thickness when cooling; moreover, circulating water of the first water tank subjected to heat exchange is delivered to a second water tank disposed in the flattening unit, and then the first conveyor belt made of the memory alloy is deformed in the second water tank to drive the driving wheel disposed in the second water tank to rotate, thereby achieving the purpose of synchronously rotating the second rolling roller set on both sides of the light guide film in the thickness direction in the flattening unit. On the one hand, the rolling of the second rolling roller set on both sides of the light guide film further flattens the light guide film, removes creases, and eliminates the phenomenon of winding ribs; on the other hand, secondary use of the cooling heat-exchange energy of the light guide film is realized, and the energy utilization efficiency is improved. The present invention is further provided with an air delivery mechanism having two airflow pipes. One airflow pipe is delivered to the cooling shaping unit for improving the heat exchange efficiency of the cooling shaping unit and speeding up the cooling and shaping of the light guide film, and the other airflow pipe is delivered to the flattening unit and used as the initial starting force of the third drive device constructed by the first conveyor belt made of memory alloy or the power supplement when the third drive device is running, so as to realize continuous operation of the third drive device.

In the present invention, after use, the circulating water in the second water tank further excludes natural cooling, or after cooled in other ways, the circulating water flows into the first water tank from the first water inlet to realize the water recycling of the light guide film production device. By means of efficient utilization of the heat of the circulating water in the light guide film production process, uniform cooling in the light guide film production process is ensured, the uneven thickness and creases of the light guide film are effectively avoided, the quality of the light guide film is improved, the energy consumption in the light guide film production process is reduced, and the production costs are lowered.

It should be understood that all combinations of the foregoing concepts and additional concepts described below in detail can be considered as part of the subject matter of invention of the present disclosure as long as such concepts do not contradictory to each other.

The foregoing and other aspects, embodiments, and features taught in the present invention can be more fully understood from the following description in conjunction with the accompanying drawings. Other additional aspects of the present invention, such as features and/or beneficial effects of the exemplary embodiments, are apparent in the following description, or are obtained from the practice of specific embodiments taught in the present invention.

BRIEF DESCRIPTION OF THE DRAWINGS

The drawings are not intended to be drawn to scale. In the drawings, each identical or approximately identical component shown in each drawing can be denoted by the same reference numeral. For the sake of clarity, not every component is marked in each drawing. Now, embodiments of various aspects of the present invention are described by examples and with reference to the drawings, in which.

Figure 1:
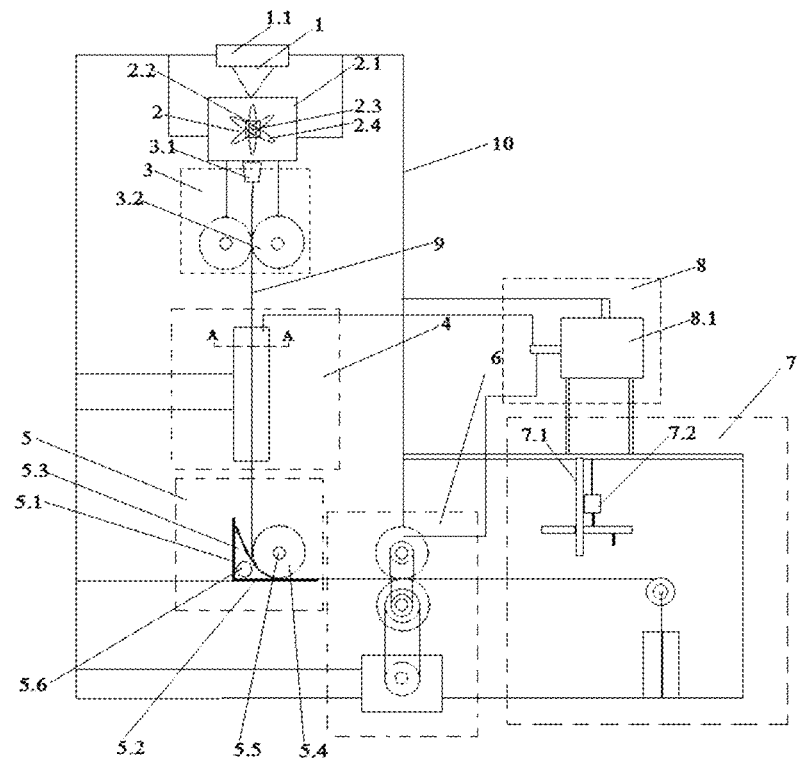
FIG. 1 illustrates a schematic structural diagram of a light guide film production device.

In the drawings, the specific meanings of reference numerals are as follows:

1—feeding unit, 1.1—feeding port, 2—fusion stirring unit, 2.1—stirring tank, 2.2—stirring drive device, 2.3—stirring blade spindle, 2.4—stirring blade, 3—extrusion molding unit, 3.1—stamping head, 3.2—first rolling roller set, 4—cooling shaping unit, 4.1—first water tank, 4.1.1—first wall surface, 4.1.2—second wall surface, 4.2—boss, 4.2.1—opening, 4.3—pressure block, 4.4—memory alloy plate, 4.5—first sliding groove, 4.6—screw rod, 4.7—slider, 4.8—elastic element, 4.9—first connecting rod, 4.10—second sliding grove, 4.11—second connecting rod, 4.12—cover block, 4.13—slot, 5—guide leveling unit, 5.1—first plane, 5.2—second plane, 5.3—arc—shaped transitional connection portion, 5.4—guide wheel, 5.5—first water channel, 5.6—second water channel, 6—flattening unit, 6.1—second rolling roller set, 6.2—roller shaft, 6.3—blade, 6.4—second water tank, 6.5—driving wheel, 6.6—first driven wheel, 6.7—first conveyor belt, 6.8—second driven wheel, 6.9—third driven wheel, 6.10—second conveyor belt, 6.11—motor, 7—finished product winding unit, 7.1—mounting shaft, 7.2—cylinder, 7.3—fan—shaped plane, 7.4—cutter, 7.5—rib, 7.6—groove, 8—air delivery mechanism, 8.1—compressed air source, 8.2—first airflow pipe, 8.3—air nozzle, 8.3.1—first mounting plate, 8.3.2—second mounting plate, 8.3.3—bottom plate, 8.4—second airflow pipe, 9—light guide film, 10—mounting bracket.

DETAILED DESCRIPTION

In order to better understand the technical content of the present invention, specific embodiments are specially listed, and are described below in conjunction with the accompanying drawings.

Various aspects of the present invention are described in the present disclosure with reference to the accompanying drawings, in which many illustrated embodiments are shown. The embodiments of the present disclosure are not defined to include all aspects of the present invention. It should be understood that various concepts and embodiments described above, as well as those concepts and embodiments described below in detail can be implemented in any of many ways, because the concepts and embodiments disclosed in the present invention do not limited to any embodiment. In addition, some aspects of the present disclosure may be used alone or in any appropriate combination with other aspects of the present disclosure.

Based on the technical problems in the prior art that the cooling of the light guide film directly adopts water cooling or air cooling, there are phenomena that the thickness of the light guide film is uneven due to multiple process steps or uneven cooling, and in the process of conveying the light guide film to the winding machine, creases are formed on the surface of the light guide film due to the asynchronous movement of the flattening unit and the light guide film to affect the quality of the light guide film, the present invention aims to provide a light guide film production device, which is provided with a cooling shaping unit of a new structure, recycles the heat in the cooling setting stage of the light guide film, reduces the energy consumption of light guide film production equipment while improving the quality of the light guide film, and lowers production costs.

The light guide film production device of the present invention is further specifically described below with reference to the drawings.

As shown in FIG. 1, the light guide film production device includes a mounting bracket 10 and a feeding unit 1, a fusion stirring unit 2, an extrusion molding unit 3, a cooling shaping unit 4, a guide leveling unit 5, a flattening unit 6, and a finished product winding unit 7 which are sequentially arranged on the mounting bracket 10. The feeding unit 1 includes a feeding port 1.1 which is formed at the top of the light guide film production device and is fixed by the mounting bracket 10. The fusion stirring unit 2 includes a stirring tank 2.1, and a stirring drive device 2.2 and a stirring blade spindle 2.3 connected to an output end of the stirring drive device 2.2, as well as stirring blades 2.4 connected to the stirring blade spindle 2.3, the stirring drive device 2.2 and the stirring blade spindle 2.3 being respectively disposed in the stirring tank 2.1. The feeding port 1.1 is communicated with the stirring tank 2.1 by means of a delivery pipe. The fusion stirring unit 2 is configured to fuse and uniformly mix the raw materials of the light guide film feed from the feed port 1.1. The extrusion molding unit 3 includes a stamping head 3.1 disposed at the bottom of the stirring tank 2.1, a first rolling roller set 3.2 disposed directly under the stamping head 3.1, and a first drive device configured to drive the first rolling roller set 3.2 to rotate. The stamping head 3.1 is communicated with the stirring tank 2.1 and configured to supply raw materials stirred by the fusion stirring unit 2 to the abut-against part of two rolling rollers of the first rolling roller set 3.2 at a slow speed, and the rolling rollers can be cylindrical rolling rollers or polygonal rolling rollers. The first rolling roller set 3.2 is configured to extrude the raw materials into a light guide film 9, and in order to facilitate the extrusion molding of the light guide film 9, a heating device, such as a heating rod, may also be provided inside the rolling rollers of the first rolling roller set 3.2.

The cooling shaping unit 4 is disposed directly under the extrusion molding unit 3, and includes a first water tank 4.1 and a plurality of edge film pressing mechanisms. The cooling shaping unit 4 is configured to relatively fix the side film of the extruded light guide film 9 and realize the cooling shaping and the heat recovery of the light guide film 9. The guide leveling unit 5 is disposed below the cooling shaping unit 4, and is configured to adjust the light guide film transmitted in the vertical direction to be transmitted in the horizontal direction to facilitate subsequent processing. The flattening unit 6 is set as the next step after the light guide film 9 passes through the guide leveling unit 5, and is used to prevent the warping of the light guide film 9 and the longitudinal creases generated along the direction of the light guide film during long-distance transmission. The finished product winding unit 7 includes a cutter mechanism and a winding machine. The cutter mechanism is used to cut off the light guide film 9 when the light guide film 9 wound by the winding machine reaches a set winding length to complete the winding work.

As shown in FIGS. 2-5, the first water tank 4.1 is set as a square tube structure which is provided with a first water inlet at one end in the length direction and a first water outlet at the other end. The light guide film 9 perpendicularly penetrates through the inside of the square tube structure from the end where the first water inlet is formed, and the central axis of the light guide film 9 coincides with the central axis of the square tube structure. A wall surface parallel to the surface of the light guide film 9 in inner wall surfaces of the square tube structure is defined as a first wall surface 4.1.1, and a wall surface perpendicular to the surface of the light guide film 9 in the inner wall surfaces of the square tube structure is defined as a second wall surface 4.1.2. The edge film pressing mechanisms are disposed on the first wall surface 4.1.1 in a direction parallel to the central axis of the square tube structure. At least two edge film pressing mechanisms are correspondingly disposed on each of the first wall surfaces 4.1.1, and the edge film pressing mechanisms on two first wall surfaces 4.1.1 parallel to each other are symmetrically mounted on both sides of the light guide film 9 in the width direction.

Specifically, the edge film pressing mechanism includes a boss 4.2, a linear guide rail provided with a plurality of sliders 4.7, a plurality of pressure blocks 4.3, and a plurality of memory alloy plates 4.4 with an arc memory shape. The boss 4.2 is disposed on the first wall surface 4.1.1 along the direction of the central axis of the square tube structure, and the cross section of the boss 4.2 along the length direction is a U-like structure, and an opening of the U-like structure faces the first wall surface 4.1.1. The linear guide rail is arranged along the length direction of the boss 4.2, and further includes a first sliding groove 4.5, a screw rod 4.6 disposed in the first sliding groove 4.5, and a second drive device connected to the screw rod 4.6. The screw rod 4.6 is parallel to the first sliding groove 4.5. The sliders 4.7 are sleeved on the screw rod 4.6 and move in the first sliding groove 4.5 along the length direction of the screw rod 4.6. End faces of the sliders 4.7 close to the light guide film 9 are provided with elastic elements 4.8. The elastic elements 4.8 are connected to the pressure blocks 4.3. In embodiments shown in the drawings, the elastic elements 4.8 are springs.

A plurality of memory alloy plate installation stations are formed on the part of the first wall surface 4.1.1 forming a surrounding structure with the boss 4.2, and the memory alloy plates 4.4 are disposed in the memory alloy plate installation stations. Openings 4.2.1 having one-to-one correspondence to the memory alloy plate installation stations are formed at the bottom of the U-like structure of the boss 4.2, and the size of the openings 4.2.1 is at most such that when the memory alloy plates 4.4 are heated to recover the arc shape, a part of the arc passes through the opening 4.2.1 and abuts against the pressure blocks 4.3, so that the pressure blocks 4.3 press the edge film of the light guide film 9.

The cooling shaping unit 4 performs heat exchange on the light guide film 9 by means of the first water tank 4.1 to recover heat. The temperature of the memory alloy plate 4.4 rises due to the heat dissipation of the light guide film 9, and the memory alloy plate 4.4 recovers the memory shape to press the edge film of the light guide film 9, and then provides tensile extension of the light guide film 9 in its width direction via the elastic control of the elastic element 4.8, effectively preventing the light guide film 9 from undergoing a large deformation when it is cooled to produce creases and uneven thickness. The start of the memory alloy plate 4.4 realizes preliminary utilization of the cooling and heat dissipation of the light guide film 9.

Figure 6:
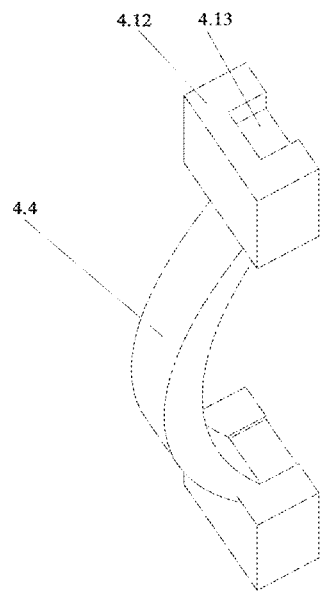
FIG. 6 illustrates a memory alloy plate that is heated to recover the memory shape.
Figure 7:
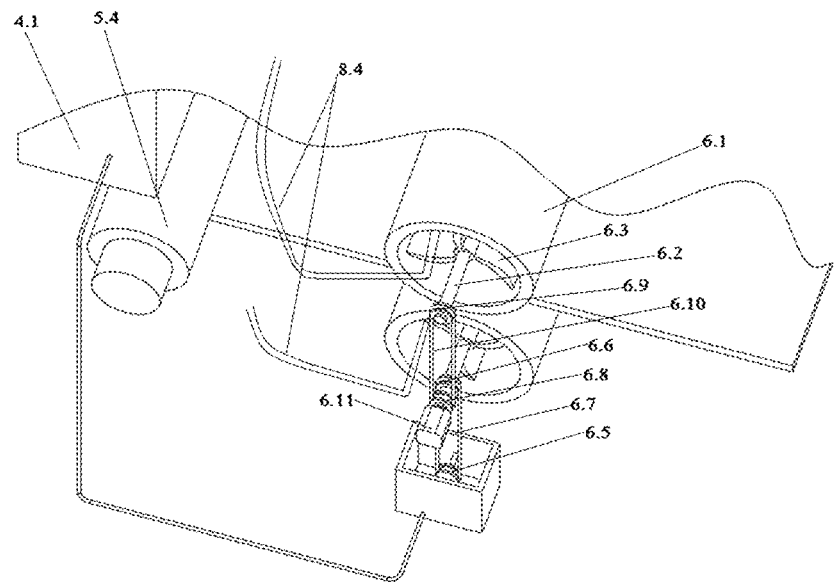
FIG. 7 illustrates a structural diagram of a third drive device

As shown in FIGS. 6 and 7, the flattening unit 6 includes a second rolling roller set 6.1, and a third drive device configured to drive the second rolling roller set 6.1 to rotate. The second rolling roller set 6.1 includes two parallel and corresponding cylindrical rolling rollers disposed at both sides of the light guide film 9 in the thickness direction. The roller surfaces of the two cylindrical rolling rollers abut against the surface of the light guide film 9. A hollow hub-like structure is disposed inside the cylindrical rolling roller, and includes a roller shaft 6.2 and a plurality of blades 6.3 connected to the roller shaft 6.2. The third drive device includes a second water tank 6.4, a driving wheel 6.5, a first driven wheel 6.6, a first conveyor belt 6.7 made of memory alloy, a second driven wheel 6.8, a third driven wheel 6.9, a second conveyor belt 6.10, and a motor 6.11.

Specifically, the second water tank 6.4 is communicated with the first water outlet by means of a pipe, and the driving wheel 6.5 is disposed in the second water tank 6.4. The first driven wheel 6.6 and the second driven wheel 6.8 are spaced apart at one end of the roller shaft 6.2 of any of the cylindrical rolling rollers. The third driven wheel 6.9 is disposed on the end of the roller shaft 6.2 of the other cylindrical rolling roller at the same side, and the position of the first driven wheel 6.6 corresponds to that of the driving wheel 6.5. The first conveyor belt 6.7 is sleeved on the driving wheel 6.5 and the first driven wheel 6.6, the second conveyor belt 6.10 is sleeved on the second driven wheel 6.8 and the third driven wheel 6.9, and at least part of the first conveyor belt 6.7 is submerged in the circulating water in the second water tank 6.4. The motor 6.11 is disposed at the end of the first driven wheel 6.6 where the roller shaft 6.2 is mounted, and is configured to initially start the rotation of the first driven wheel to rotate 6.6. In the flattening unit 6, the first conveyor belt 6.7 made of memory alloy can be continuously deformed in the circulating water of the second water tank 6.4 after the first driven wheel 6.6 stops rotating under the initial drive of the motor 6.11, maintaining the rotation of the driving wheel 6.5, thereby maintaining the rotation of the second conveyor belt 6.10, so that two cylindrical rolling rollers in the second rolling roller set 6.1 continuously rotate synchronously, and have a certain rotation speed, to avoid damages on the surface of the light guide film 9 caused by the asynchronous movement of the second rolling roller set 6.1 driven by the light guide film 9 transmission. On the one hand, the second rolling roller set 6.1 further flattens the light guide film 9 conveyed between the guide leveling unit 5 and the finished product winding unit 7 to remove creases and eliminate the phenomenon of winding ribs; on the other hand, the use of circulating water after cooling and heat radiation of the light guide film 9 realizes the secondary utilization of energy.

Figure 2:
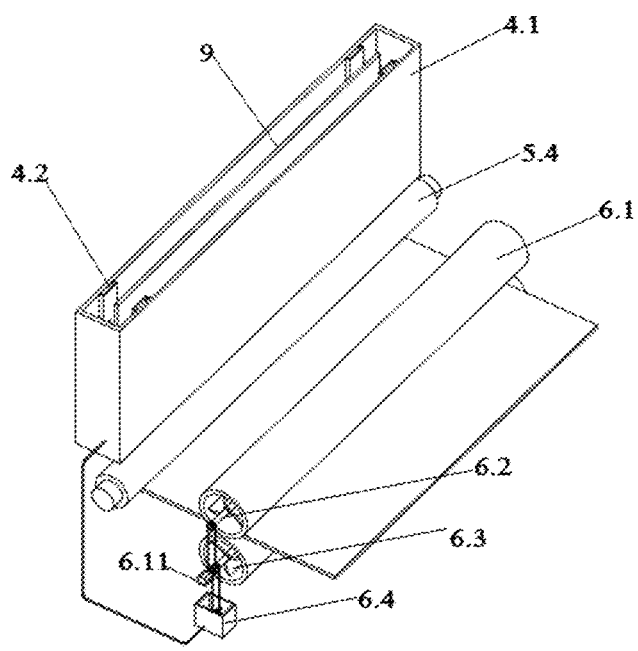
FIG. 2 illustrates a perspective view of a cooling shaping unit, a leveling guide unit and a flattening unit.
Figure 3:
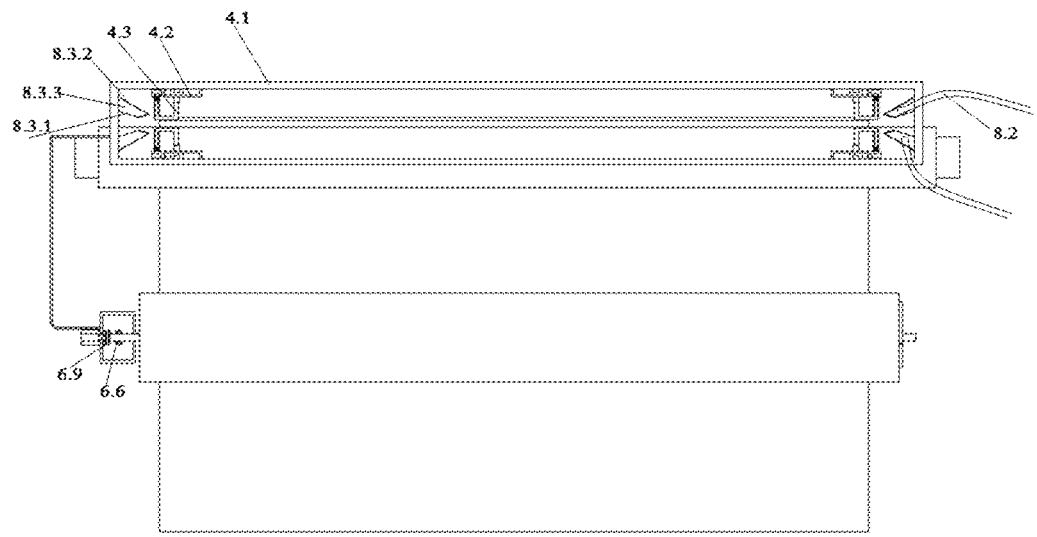
FIG. 3 illustrates an overhead view of a cooling shaping unit, a leveling guide unit and a flattening unit.
Figure 4:
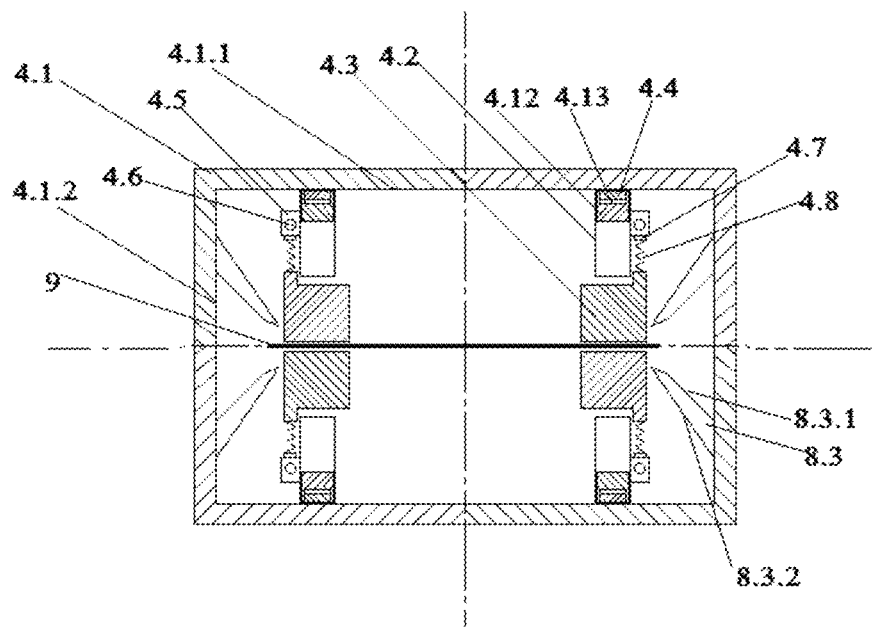
FIG. 4 illustrates a cross-sectional view of a cooling shaping unit along line A-A in FIG. 1.

Further, as shown in FIGS. 2-4, the cooling shaping unit 4 further includes an air delivery mechanism 8 which includes a compressed air source 8.1, a plurality of first airflow pipes 8.2, and air nozzles 8.3. The air nozzles 8.3 are arranged on the second wall surfaces 4.1.2 in a direction parallel to the central axis of the square tube structure, and two air nozzles 8.3 are disposed on any of the second wall surfaces 4.1.2, and the two air nozzles 8.3 are symmetrical along the thickness direction of the light guide film 9.

Figure 8A:
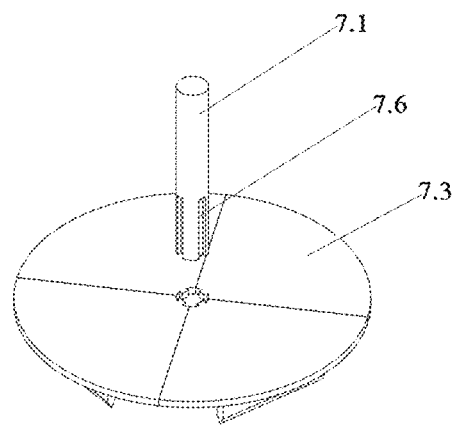
FIG. 8(a) illustrates a perspective view of a cutter mechanism.
Figure 8B:
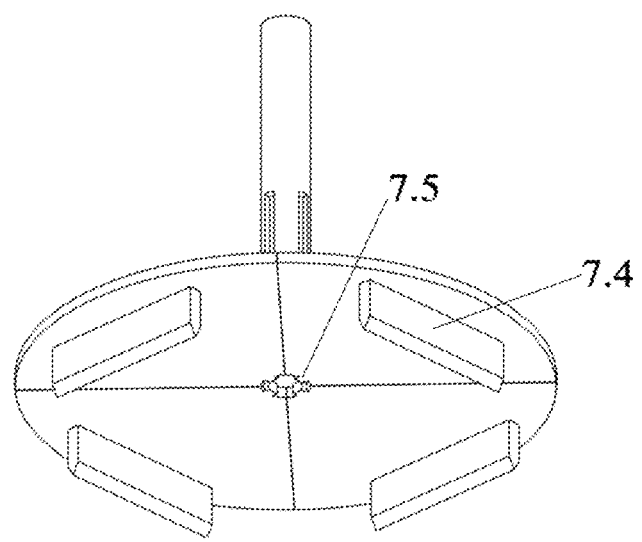
FIG. 8(b) illustrates a perspective view of a cutter mechanism.

As shown in FIG. 8, the air nozzle 8.3 includes a first mounting plate 8.3.1, a second mounting plate 8.3.2, and two bottom plates 8.3.3. The first mounting plate 8.3.1, the second mounting plate 8.3.2, the two bottom plates 8.3.3 and the second wall surface 4.1.2 together form a cavity structure with one side open and two ends closed. An opening is formed on the side of the cavity structure away from the second wall surface 4.1.2. The opening of the cavity structure is parallel to the central axis of the square tube structure and faces the matching position of the edge film pressing mechanism and the light guide film 9. The orientation of the air nozzle 8.3 toward the matching position facilitates the cooling and heat dissipation of the press-fit position of the pressure block 4.3 and the light guide film 9. One end of the first airflow pipe 8.2 is communicated with an outlet of the compressed air source 8.1, and the other end penetrates from the outside of the square tube structure through the bottom plates 8.3.3 to communicate with the cavity structure. Each of the two bottom plates 8.3.3 of the air nozzle 8.3 is connected to at least one first airflow pipe 8.2. The air delivery mechanism 5 delivers the airflow to the cooling shaping unit 4, which facilitates improving the heat exchange efficiency of the cooling shaping unit 4 and accelerating the cooling and shaping of the light guide film 9. In some embodiments, in order to further improve the heat exchange efficiency of the first water tank 4.1 and the light guide film, the inner wall surface of the first water tank 4.1 is set as a corrugated surface, and the boss 4.2 is disposed on the corrugated surface. The heat exchange area with the light guide film is increased by using the corrugated surface, thereby improving the heat exchange efficiency of the cooling shaping unit 4.

Further, as shown in FIG. 7, the air delivery mechanism 5 further includes a plurality of second airflow pipes 8.4. One end of the second airflow pipe 8.4 is communicated with the outlet of the compressed air source 8.1, and the other end extends between two adjacent blades 6.3 of the cylindrical rolling roller, and the part of the second airflow pipe 8.4 extending inside the cylindrical rolling roller is parallel to the roller shaft 6.2 of the cylindrical rolling roller. The end of the part of the second airflow pipe 8.4 extending inside the cylindrical rolling roller is closed, and a plurality of blow holes are uniformly formed on the side wall of the pipe close to the blades 6.3 on one side. The blow holes are used for blowing the blades 6.3 to rotate. Any of the cylindrical rolling rollers in the second rolling roller set 6.1 is provided with at least one second airflow pipe 8.4 partially extending inside the cylindrical rolling roller, and any of the second airflow pipes 8.4 disposed in the same cylindrical rolling roller blows the blades 6.3 to drive the cylindrical rolling roller to rotate in the same direction. The airflow delivered from the air delivery mechanism 5 to the flattening unit 6 serves as the initial starting force of the third drive device constructed by the first conveyor belt 6.7 made of memory alloy or the power supplement when the third drive device is running, so as to realize continuous operation of the third drive device.

With reference to the embodiment shown in FIG. 4, in order to ensure that the pressure block 4.3 is pressed on the light guide film 9, without being affected by its own gravity, and the pressure on the light guide film 9 is uneven. The slider 4.7 is also connected to a support mechanism for supporting the pressure block 4.3. The support mechanism is disposed below the elastic element 4.8, and includes a first connecting rod 4.9, a second connecting rod 4.11, and a second sliding groove 4.10. One end of the first connecting rod 4.9 is connected to the slider 4.7, and the other end is connected to the second sliding groove 4.10. One end of the second connecting rod 4.11 is connected to the pressure block 4.3, and the other end is movably disposed in the second sliding groove 4.10. The pressure block 4.3 moves toward the surface of the light guide film 9 under the abut-against action when the memory alloy plates 4.4 are heated to recover the arc shape, and drives the second connecting rod 4.11 to slide in the second sliding groove 4.10, thereby always ensuring that the pressure block 4.3 and the edge film of the light guide film 9 are evenly pressed and stressed, and are evenly stretched on both sides of the light guide film 9 in the width direction. In some embodiments, in order to prevent the pressure block 4.3 from generating obvious indentations on the surface of the light guide film 9, the ridge of an end face of the pressure block 4.3 close to the light guide film 9 is set as an arc-shaped transition structure.

Figure 5:
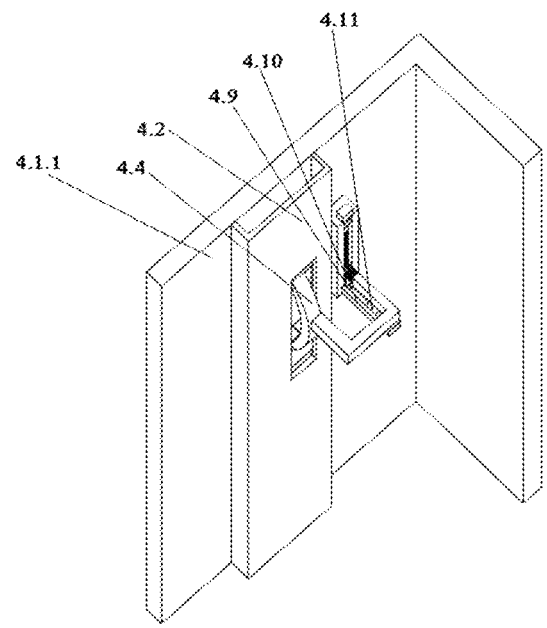
FIG. 5 illustrates a specific structural diagram of an edge film pressing mechanism.

Further, with reference to the embodiment shown in FIG. 5, two cover blocks 4.12 facing and spaced apart from each other along the length direction of the boss 4.2 are provided in the memory alloy plate installation station. Slots 4.13 extending toward the inside of the cover blocks 4.12 are formed on opposite side surfaces of the two cover blocks 4.12. The size of the slot 4.13 is adapted to the size of the memory alloy plate 4.4. The slots 4.13 are used for fixing the ends of the memory alloy plates 4.4, and the depth of the slots 4.13 is at least such that the memory alloy plates 4.4 do not fall out of the slots 4.13 when the memory alloy plates 4.4 are heated to recover the arc shape.

With reference to the embodiment shown in FIG. 1, the guide leveling unit 5 includes a leveling right-angle mechanism and a guide wheel 5.4. The leveling right-angle mechanism includes a first plane 5.1 located in the vertical direction, a second plane 5.2 located in the horizontal direction, and an arc-shaped transitional connection portion 5.3 for connecting the first plane 5.1 and the second plane 5.2 to form a right angle. The guide wheel 5.4 is disposed on the side of the arc-shaped transitional connection portion 5.3 close to the center of a circle. The guide wheel 5.4 is parallel to any of the cylindrical rolling rollers in the second rolling roller set 6.1, and has a degree of freedom to rotate about a guide wheel axle. The guide wheel 5.4 is in clearance fit to the arc-shaped transitional connection portion 5.3. The light guide film 9 is conveyed to the flattening unit 6 from the fit clearance of the guide wheel 5.4 and the arc-shaped transitional connection portion 5.3. A first water channel 5.5 is formed on the guide wheel axle along its axial direction, a second water channel 5.6 is formed in the arc-shaped transitional connection portion 5.3, and the first water channel 5.5 and the second water channel 5.6 are respectively communicated with the first water tank 4.1 by means of pipes.

The purpose of forming the first water channel 5.5 and the second water channel 5.6 on the guide leveling unit 5 is to perform secondary heat exchange with the light guide film 9 on the one hand, and to facilitate eliminating thermal stress inside the light guide film 9 on the other hand, thereby preventing the light guide film 9 from warping.

In some embodiments, since the second rolling roller set 6.1 flattens the light guide film 9 with the cylindrical rolling rollers, the phenomenon that the flattened light guide film 9 is warped may occur. Therefore, in the embodiments, a polygonal rolling roller set correspondingly disposed at both sides of the light guide film 9 in the thickness direction is also provided between the flattening unit 6 and the finished product winding unit 7, and the axial direction of the polygonal rolling roller set is parallel to the axial direction of the second rolling roller set 6.1 for secondary flattening the light guide film 9.

In the foregoing embodiments, in order to ensure that the first rolling roller set, the guide wheel 5.4, the second rolling roller set 6.1, etc. are installed stably during the production process of the light guide film 9, the foregoing structures are relatively fixed to the mounting bracket 10.

As shown in FIGS. 1 and 8, the cutter mechanism includes a mounting shaft 7.1 disposed perpendicular to the surface of the light guide film 9 in the vertical direction, a cylinder 7.2 disposed on the mounting shaft 7.1, a plurality of fan-shaped planes 7.3 arranged along the axial circumference of the mounting shaft 7.1, and a cutter 7.4 mounted on the side of any of the fan-shaped planes 7.3 close to the light guide film 9. A cutter fixing groove is formed on the plate surface of the fan-shaped plane 7.3 close to the light guide film 9, and the cutter 7.4 is disposed in the cutter fixing groove and is parallel to an edge on the arc side of the fan-shaped plane 7.3. The mounting shaft 7.1 is movably connected to the mounting bracket 10, and has a degree of freedom to rotate on the mounting bracket 10 along the radial direction. Ribs 7.5 are disposed at the middle of the arc side of any of the fan-shaped planes 7.3 close to the mounting shaft 7.1. Grooves 7.6 extending to the end face of the mounting shaft 7.1 close to the light guide film 9 are formed on the mounting shaft 7.1 at the positions corresponding to the ribs 7.5. The ribs 7.5 are adapted to the grooves 7.6. A locking mechanism is disposed at the end of a cylinder telescopic rod away from the cylinder 7.2, and is configured to lock and fix any of the fan-shaped planes 7.3, and when any of the fan-shaped planes 7.3 is fixed to the cylinder 7.1, the cutter 7.4 on the fan-shaped plane 7.3 is perpendicular to the length direction of the light guide film 9, facilitating cutting the light guide film 9. In order to ensure that the cylinder telescopic rod can drive the fan-shaped plane 7.3 to retract to the initial position after extending and driving the cutter on the fan-shaped plane 7.3 to cut the light guide film 9, the length of the groove 7.6 should be set at least such that after the cylinder telescopic rod extends out, at least part of the rib 7.5 of the fan-shaped plane 7.3 cooperates with the groove 7.6 to form a guide structure. In some embodiments, in order to improve the connection strength between the fan-shaped planes 7.3 and the mounting shaft 7.1, the arc edges of any of the fan-shaped planes 7.3 close to the mounting shaft 7.1 can be provided with a plurality of ribs 7.5, and similarly, a plurality of grooves 7.6 are formed on the mounting shaft 7.1 to improve the connection strength.

The locking mechanism can be set as a buckle installed on the side of the fan-shaped plane 7.3 away from the light guide film, and a bayonet installed on the end of the cylinder telescopic rod away from the cylinder 7.3. The relative fixation of the cylinder 7.2 and any of the fan-shaped planes 7.3 can be completed by fitting and locking the bayonet and the buckle and then fixing with bolts. In the present appli-cation, the cutter mechanism is mainly provided for replacing the cutters 7.4 of different sizes when the light guide film production device of the present invention is applied to the production of the light guide films 9 of different materials and sizes, or replacing a new cutter 7.4 when the cutter 7.4 is damaged, so that the application range of the present invention wider.

Although the present invention is disclosed above with preferred embodiments, the present invention is not limited thereto. Those of ordinary knowledge in the technical field to which the present invention belongs can make various changes and modifications without departing from the spirit and scope of the present invention. Therefore, the scope of protection of the present invention should be subject to the scope defined by the appended claims.

The invention claimed is:

1. A light guide film production device, comprising a mounting bracket, and a feeding unit, a fusion stirring unit, an extrusion molding unit, a cooling shaping unit, a guide leveling unit, a flattening unit, and a finished product winding unit which are sequentially arranged on the mounting bracket, wherein the feeding unit comprises a feeding port which is formed at a top of the light guide film production device; the fusion stirring unit comprises a stirring tank, and a stirring drive device and a stirring blade spindle connected to an output end of the stirring drive device, as well as stirring blades connected to the stirring blade spindle, the stirring drive device and the stirring blade spindle being respectively disposed in the stirring tank; the feeding port is communicated with the stirring tank by means of a delivery pipe; the extrusion molding unit comprises a stamping head disposed at a bottom of the stirring tank, a first rolling roller set disposed directly under the stamping head, and a first drive device configured to drive the first rolling roller set to rotate; the stamping head is communicated with the stirring tank and configured to supply raw materials stirred by the fusion stirring unit to the first rolling roller set at a first speed; and the first rolling roller set is configured to extrude the raw materials into a light guide film;

wherein the cooling shaping unit is disposed directly under the extrusion molding unit, and comprises a first water tank and a plurality of edge film pressing mechanisms;

the first water tank is set as a square tube structure which is provided with a first water inlet at a first end in a length direction and a first water outlet at a second end; the light guide film perpendicularly penetrates through an inside of the square tube structure from the first end where the first water inlet is formed, and a central axis of the light guide film coincides with a central axis of the square tube structure;

a plurality of wall surfaces parallel to a surface of the light guide film in a plurality of inner wall surfaces of the square tube structure is defined as a plurality of first wall surfaces, and a plurality of wall surfaces perpendicular to the surface of the light guide film in the plurality of the inner wall surfaces of the square tube structure is defined as a plurality of second wall surfaces;

the edge film pressing mechanisms are disposed on one of the plurality of the first wall surfaces in a direction parallel to the central axis of the square tube structure; at least two edge film pressing mechanisms are correspondingly disposed on each of the plurality of the first wall surfaces; and the edge film pressing mechanisms on two first wall surfaces parallel to each other are symmetrical on both sides of the light guide film in a width direction;

the edge film pressing mechanism comprises a boss, a linear guide rail provided with a plurality of sliders, a plurality of pressure blocks, and a plurality of memory alloy plates with an arc shape;

the boss is disposed on the plurality of the first wall surfaces along a direction of the central axis of the square tube structure, and a cross section of the boss along a length direction of the boss is a U-shape structure, and an opening of the U-shape structure faces the plurality of the first wall surfaces;

the linear guide rail is arranged along the length direction of the boss, and further comprises a first sliding groove, a screw rod disposed in the first sliding groove, and a second drive device connected to the screw rod; the screw rod is parallel to the first sliding groove; the sliders are sleeved on the screw rod and move in the first sliding groove along a length direction of the screw rod; end faces of the sliders facing to the light guide film are provided with elastic elements; and the elastic elements are connected to the pressure blocks;

a plurality of memory alloy plate installation stations are formed on a part of the plurality of the first wall surfaces forming a surrounding structure with the boss, and the memory alloy plates are disposed in the memory alloy plate installation stations; openings having one-to-one correspondence to the memory alloy plate installation stations are formed at a bottom of the U-shape structure of the boss, and a size of the openings is at most such that when the memory alloy plates are heated to recover the arc shape, a part of the arc shape passes through the openings and abuts against the pressure blocks, so that the pressure blocks press an edge film of the light guide film;

the guide leveling unit is disposed below the cooling shaping unit, and is configured to adjust the light guide film transmitted in a vertical direction to be transmitted in a horizontal direction;

the flattening unit comprises a second rolling roller set, and a third drive device configured to drive the second rolling roller set to rotate; the second rolling roller set comprises two parallel and corresponding cylindrical rolling rollers disposed at both sides of the light guide film in a thickness direction; the roller surfaces of the two cylindrical rolling rollers abut against the surface of the light guide film; and a hollow hub-like structure is disposed inside the cylindrical rolling roller, and comprises a roller shaft and a plurality of blades;

the third drive device comprises a second water tank, a driving wheel, a first driven wheel, a first conveyor belt made of memory alloy, a second driven wheel, a third driven wheel, a second conveyor belt, and a motor;

the second water tank is communicated with the first water outlet by means of a pipe, and the driving wheel is disposed in the second water tank; the first driven wheel and the second driven wheel are spaced apart at one end of the roller shaft of any of the cylindrical rolling rollers; the third driven wheel is disposed on the end of the roller shaft of the other cylindrical rolling roller at a same side, and a position of the first driven wheel corresponds to that of the driving wheel; the first conveyor belt is sleeved on the driving wheel and the first driven wheel, the second conveyor belt is sleeved on the second driven wheel and the third driven wheel, and at least part of the first conveyor belt is submerged in a circulating water in the second water tank; and the motor is disposed at an end of the first driven wheel where the roller shaft is mounted, and is configured to initially start the rotation of the first driven wheel to rotate; and the finished product winding unit comprises a cutter mechanism and a winding machine; and the cutter mechanism is configured to cut the light guide film when the light guide film wound by the winding machine reaches a set length.

2. The light guide film production device according to claim 1, wherein the cooling shaping unit further comprises an air delivery mechanism which comprises a compressed air source, a plurality of first airflow pipes, and air nozzles;

the air nozzles are arranged on the plurality of the second wall surfaces in a direction parallel to the central axis of the square tube structure, and two air nozzles are disposed on any of the plurality of the second wall surfaces, and the two air nozzles are symmetrical along the thickness direction of the light guide film;

each of the air nozzles comprises a first mounting plate, a second mounting plate, and two bottom plates; the first mounting plate, the second mounting plate, the two bottom plates and the plurality of the second wall surfaces together form a cavity structure with one side open and two ends closed; an opening is formed on a side of the cavity structure away from the plurality of the second wall surfaces; and the opening of the cavity structure is parallel to the central axis of the square tube structure and faces a matching position of the edge film pressing mechanism and the light guide film; and one end of the first airflow pipes is communicated with an outlet of the compressed air source, and the other end penetrates from an outside of the square tube structure through one of the two bottom plates to communicate with the cavity structure; and each of the two bottom plates of the each of the air nozzles is connected to at least one first airflow pipe.

3. The light guide film production device according to claim 2, wherein the air delivery mechanism further comprises a plurality of second airflow pipes;

one end of each of the second airflow pipes is communicated with the outlet of the compressed air source, and the other end extends between two adjacent blades of the cylindrical rolling roller, and a part of the each of the second airflow pipes extending inside the cylindrical rolling roller is parallel to the roller shaft of the cylindrical rolling roller; the end of the part of the each of the second airflow pipes extending inside the cylindrical rolling roller is closed, and a plurality of blow holes are uniformly formed on the side wall of the pipe facing towards the blades on one side; and the blow holes are used for blowing the blades to rotate; and any of the cylindrical rolling rollers in the second rolling roller set is provided with at least one second airflow pipe partially extending inside the cylindrical rolling roller, and any of the second airflow pipes disposed in the same cylindrical rolling roller blows the blades to drive the cylindrical rolling roller to rotate in a same direction.

4. The light guide film production device according to claim 1, wherein each of the sliders is also connected to a support mechanism for supporting one of the plurality of the pressure blocks; the support mechanism is disposed below one of the elastic elements, and comprises a first connecting rod, a second connecting rod, and a second sliding groove; one end of the first connecting rod is connected to the each of the sliders, and the other end is connected to the second sliding groove; one end of the second connecting rod is connected to the one of the plurality of the pressure blocks, and the other end is movably disposed in the second sliding groove; and the one of the plurality of the pressure blocks moves toward the surface of the light guide film under an abut-against action when the memory alloy plates are heated to recover the arc shape, and drives the second connecting rod to slide in the second sliding groove.

5. The light guide film production device according to claim 1, wherein two cover blocks facing and spaced apart from each other along the length direction of the boss are provided in the memory alloy plate installation station; slots extending toward an inside of the cover blocks are formed on opposite side surfaces of the two cover blocks; the slots are used for fixing the ends of the memory alloy plates, and a depth of the slots is at least such that the memory alloy plates do not fall out of the slots when the memory alloy plates are heated to recover the arc shape.

6. The light guide film production device according to claim 1, wherein the guide leveling unit comprises a leveling right-angle mechanism and a guide wheel;

the leveling right-angle mechanism comprises a first plane located in the vertical direction, a second plane located in the horizontal direction, and an arc-shaped transitional connection portion for connecting the first plane and the second plane to form a right angle; the guide wheel is disposed on a side of the arc-shaped transitional connection portion adjacent to a center of a circle; the guide wheel is parallel to any of the cylindrical rolling rollers in the second rolling roller set, and has a degree of freedom to rotate about a guide wheel axle; and the guide wheel is in clearance fit to the arc-shaped transitional connection portion; and a first water channel is formed on the guide wheel axle along an axial direction of the guide wheel, a second water channel is formed in the arc-shaped transitional connection portion, and the first water channel and the second water channel are respectively communicated with the first water tank by means of pipes.

7. The light guide film production device according to claim 4, wherein a ridge of an end face of the pressure block adjacent to the light guide film is set as an arc-shaped transition structure.

8. The light guide film production device according to claim 1, wherein a polygonal rolling roller set correspondingly disposed at both sides of the light guide film in the thickness direction is also provided between the flattening unit and the finished product winding unit, and an axial direction of the polygonal rolling roller set is parallel to an axial direction of the second rolling roller set.

9. The light guide film production device according to claim 1, wherein the cutter mechanism comprises a mounting shaft disposed perpendicular to the surface of the light guide film in the vertical direction, a cylinder, a plurality of fan-shaped planes arranged along an axial circumference of the mounting shaft, and a cutter mounted on a side of any of the fan-shaped planes facing towards the light guide film; the cutter is parallel to an edge on an arc side of the any of the fan-shaped planes; and the mounting shaft is movably connected to the mounting bracket, and has a degree of freedom to rotate on the mounting bracket along a radial direction; ribs are disposed at a middle of the arc side of any of the fan-shaped planes facing towards the mounting shaft; grooves extending to an end face of the mounting shaft adjacent to the light guide film are formed on the mounting shaft at a plurality of positions corresponding to the ribs; the ribs are adapted to the grooves; the cylinder is disposed on the mounting bracket; a locking mechanism is disposed at an end of a cylinder telescopic rod away from the cylinder, and is configured to lock and fix any of the fan-shaped planes, and when any of the fan-shaped planes is fixed to the cylinder, the cutter on the any of the fan-shaped planes is perpendicular to the length direction of the light guide film.

10. The light guide film production device according to claim 9, wherein a cutter fixing groove is formed on a plate surface of the any of the fan-shaped planes facing towards the light guide film, and the cutter is disposed in the cutter fixing groove.

* * * * *